US011574299B2

(12) United States Patent
Burrell et al.

(10) Patent No.: US 11,574,299 B2
(45) Date of Patent: Feb. 7, 2023

(54) PROVIDING IDENTIFICATION INFORMATION DURING AN INTERACTION WITH AN INTERACTIVE COMPUTING ENVIRONMENT

(71) Applicant: Equifax Inc., Atlanta, GA (US)

(72) Inventors: John Burrell, Woodinville, WA (US); Sekhar Dochibhotla, Ashburn, VA (US); Anand Krishnaswamy, Irving, TX (US); Robert Clark Fuller, Dacula, GA (US); Todd Duncan Hoover, Suwanee, GA (US)

(73) Assignee: EQUIFAX INC., Atlanta, GA (US)

( * ) Notice: Subject to any disclaimer, the term of this patent is extended or adjusted under 35 U.S.C. 154(b) by 238 days.

(21) Appl. No.: 16/160,639

(22) Filed: Oct. 15, 2018

(65) Prior Publication Data

US 2019/0050852 A1 Feb. 14, 2019

Related U.S. Application Data

(60) Continuation-in-part of application No. 16/146,256, filed on Sep. 28, 2018, now Pat. No. 11,443,316, (Continued)

(51) Int. Cl.
*G06Q 20/36* (2012.01)
*G06Q 30/02* (2012.01)
(Continued)

(52) U.S. Cl.
CPC ........... *G06Q 20/363* (2013.01); *G06Q 20/02* (2013.01); *G06Q 20/0855* (2013.01);
(Continued)

(58) Field of Classification Search
CPC .... G06Q 20/363; G06Q 20/02; G06Q 20/401; G06Q 20/3223; G06Q 30/0267;
(Continued)

(56) References Cited

U.S. PATENT DOCUMENTS 5,960,411 A 9/1999 Hartman et al.
6,119,103 A * 9/2000 Basch ................ G06Q 20/4037
705/35
(Continued)

FOREIGN PATENT DOCUMENTS

CA 2413340 C 10/2009
KR 20130103697 9/2013
(Continued)

OTHER PUBLICATIONS

Molina et al., Database Systems The Complete Book , Pearson Prentice Hall, Second Edition (Year: 2009).*
(Continued)

*Primary Examiner* — John W Hayes
*Assistant Examiner* — Dennis G Keritsis
(74) *Attorney, Agent, or Firm* — Kilpatrick Townsend & Stockton LLP

(57) ABSTRACT

Aspects and examples are disclosed for facilitating transactions with an interactive computing environment provided by a host system. In one example, a processing device receives a data network identifier or other identifier from an interactive computing environment. The data network identifier or other identifier can be associated with a mobile device conducting a transaction with the interactive computing environment. The processing device can also obtain a credential associated with the mobile device using the data network identifier. The processing device can additionally retrieve identification information from a credit file associated with the credential. The identification information can be useable for completing the transaction. The processing device can further transmit the identification information to a host server system executing the interactive computing environment.

18 Claims, 6 Drawing Sheets

Related U.S. Application Data which is a division of application No. 14/512,493, filed on Oct. 13, 2014, now Pat. No. 10,115,102.

(60) Provisional application No. 61/890,419, filed on Oct. 14, 2013.

(51) Int. Cl.

| | |
|---|---|
| *G06Q 30/06* | (2012.01) |
| *G06Q 20/32* | (2012.01) |
| *G06Q 20/12* | (2012.01) |
| *G06Q 20/08* | (2012.01) |
| *G06Q 20/40* | (2012.01) |
| *G06Q 20/38* | (2012.01) |
| *G06Q 20/02* | (2012.01) |

(52) U.S. Cl.
CPC ......... *G06Q 20/12* (2013.01); *G06Q 20/3223* (2013.01); *G06Q 20/3227* (2013.01); *G06Q 20/3821* (2013.01); *G06Q 20/401* (2013.01); *G06Q 20/407* (2013.01); *G06Q 20/4014* (2013.01); *G06Q 20/4016* (2013.01); *G06Q 30/0267* (2013.01); *G06Q 30/0631* (2013.01)

(58) Field of Classification Search
CPC ........... G06Q 30/0631; G06Q 20/3227; G06Q 20/12; G06Q 20/0855; G06Q 20/4014; G06Q 20/3821; G06Q 20/4016; G06Q 20/407

See application file for complete search history.

(56) References Cited

U.S. PATENT DOCUMENTS

| | | | | |
|---|---|---|---|---|
| 6,944,669 | B1* | 9/2005 | Saccocio | G06Q 30/06 709/224 |
| 7,080,049 | B2* | 7/2006 | Truitt | G06Q 20/16 380/30 |
| RE44,513 | E | 10/2013 | Ryan et al. | |
| 10,115,102 | B2 | 10/2018 | Burrell et al. | |
| 2004/0006535 | A1* | 1/2004 | Forbes, Jr. | H04W 24/00 705/38 |
| 2004/0122684 | A1* | 6/2004 | Kaikuranta | H04M 15/84 705/400 |
| 2006/0233332 | A1 | 10/2006 | Toms | |
| 2007/0244831 | A1 | 10/2007 | Kuo | |
| 2007/0265928 | A1 | 11/2007 | Fuchs et al. | |
| 2009/0036111 | A1* | 2/2009 | Danford | H04W 4/50 455/419 |
| 2009/0276368 | A1* | 11/2009 | Martin | G06Q 40/02 705/36 R |
| 2009/0300097 | A1 | 12/2009 | Meyer | |
| 2011/0071946 | A1* | 3/2011 | Handler | G06Q 20/10 705/35 |
| 2011/0238580 | A1 | 9/2011 | Coppinger | |
| 2011/0295750 | A1 | 12/2011 | Rammal | |
| 2011/0296513 | A1 | 12/2011 | Kasad | |
| 2011/0320347 | A1 | 12/2011 | Tumminaro et al. | |
| 2012/0030110 | A1 | 2/2012 | Prakash et al. | |
| 2012/0150750 | A1* | 6/2012 | Law | G06Q 20/3229 705/76 |
| 2012/0173406 | A1* | 7/2012 | Fei | G06Q 30/06 705/38 |
| 2012/0203605 | A1 | 8/2012 | Morgan et al. | |
| 2012/0300932 | A1 | 11/2012 | Davis et al. | |
| 2012/0331532 | A1* | 12/2012 | Walters | H04L 12/66 726/5 |
| 2013/0024371 | A1 | 1/2013 | Hariramani et al. | |
| 2013/0262311 | A1 | 10/2013 | Buhrmann et al. | |
| 2013/0309999 | A1* | 11/2013 | Modiano | H04W 4/24 455/406 |
| 2014/0109175 | A1* | 4/2014 | Barton | H04W 12/0027 726/1 |
| 2014/0122226 | A1* | 5/2014 | Downing | G06Q 30/0241 705/14.49 |
| 2014/0258136 | A1 | 9/2014 | Ellis | |
| 2014/0279523 | A1* | 9/2014 | Lynam | G06Q 20/401 705/44 |
| 2015/0026049 | A1 | 1/2015 | Theurer et al. | |
| 2015/0046339 | A1 | 2/2015 | Wong et al. | |
| 2015/0088751 | A1 | 3/2015 | Grigg et al. | |
| 2015/0106270 | A1* | 4/2015 | Burrell | G06Q 20/4014 705/44 |
| 2015/0149359 | A1 | 5/2015 | Forte | |
| 2015/0350177 | A1 | 12/2015 | Sharp et al. | |
| 2016/0171555 | A1* | 6/2016 | Buerger | G06Q 40/025 705/14.66 |
| 2016/0277380 | A1 | 9/2016 | Wagner et al. | |
| 2016/0300231 | A1 | 10/2016 | Shavell et al. | |
| 2016/0381038 | A1 | 12/2016 | Disraeli | |
| 2018/0204234 | A1* | 7/2018 | Hermoni | G06Q 10/06 |
| 2020/0145385 | A1 | 5/2020 | Chauhan et al. | |
| 2021/0044976 | A1 | 2/2021 | Avetisov et al. | |

FOREIGN PATENT DOCUMENTS

| | | |
|---|---|---|
| KR | 1020130103697 | 9/2013 |
| WO | 2006113834 | 10/2006 |
| WO | 2015057538 | 4/2015 |

OTHER PUBLICATIONS

U.S. Appl. No. 14/512,493, "Final Office Action", dated Apr. 30, 2018, 11 pages.

U.S. Appl. No. 14/512,493, "Non-Final Office Action", dated Jul. 14, 2017, 17 pages.

U.S. Appl. No. 14/512,493, "Notice of Allowance", dated Jun. 29, 2018, 18 pages.

EP14853685.7, "Extended European Search Report", dated Mar. 10, 2017, 7 pages.

PCT/US2014/060217, "International Search Report and Written Opinion", dated Jan. 12, 2015, 11 pages.

EP14853685.7, "Office Action," dated Sep. 13, 2018, 7 pages.

AU2014334713, "Second Examination Report", dated Dec. 24, 2019, 4 pages.

AU2014334713, "First Examination Report", dated May 1, 2019, 4 pages.

EP14853685.7, "Summons to Attend Oral Proceedings", Aug. 13, 2019, 10 pages.

EP14853685.7, "Summons to Attend Oral Proceedings", Nov. 15, 2019, 18 pages.

IN201637008409, "First Examination Report", dated Nov. 28, 2019, 6 pages.

PCT/US2018/027518, "International Search Report and Written Opinion", dated Jul. 26, 2018, 17 pages.

AU2014334713, "Third Examination Report", dated Apr. 30, 2020, 4 pages.

EP14853685.7, "Summons to Attend Oral Proceedings", Apr. 6, 2020, 23 pages.

U.S. Appl. No. 16/146,256, Non-Final Office Action dated Oct. 27, 2020, 21 pages.

U.S. Appl. No. 16/328,595, Notice of Allowance dated Aug. 19, 2020, 18 pages.

U.S. Appl. No. 16/328,595, Notice of Allowance dated Jun. 25, 2020, 26 pages.

Australian Patent Application No. 2018291152, "Second Examination Report", dated Apr. 26, 2021, 3 pages.

Australian Patent Application No. 2020202925, "First Examination Report", dated Jun. 23, 2021, 6 pages.

U.S. Appl. No. 16/146,256, "Final Office Action", dated Mar. 19, 2021, 19 pages.

European Patent Application No. 18822628.6, "Extended European Search Report", dated Feb. 23, 2021, 9 pages.

European Patent Application No. 21159404.9, "Extended European Search Report", dated Mar. 31, 2021, 10 pages.

U.S. Appl. No. 16/146,256, "Non-Final Office Action", dated Dec. 17, 2021, 24 pages.

(56) References Cited

OTHER PUBLICATIONS

U.S. Appl. No. 16/146,256, "Notice of Allowance", dated Apr. 6, 2022, 7 pages.
U.S. Appl. No. 16/146,256, "Notice of Allowance", dated May 19, 2022, 7 pages.
U.S. Appl. No. 16/500,788, "Non-Final Office Action", dated Oct. 4, 2021, 14 pages.
U.S. Appl. No. 16/500,788, "Notice of Allowance", dated Jun. 2, 2022, 7 pages.
U.S. Appl. No. 16/500,788, "Notice of Allowance", dated Mar. 10, 2022, 7 pages.
U.S. Appl. No. 16/772,568, "Non-Final Office Action", dated Jan. 18, 2022, 14 pages.
U.S. Appl. No. 16/772,568, "Notice of Allowance", dated May 5, 2022, 11 pages.
U.S. Appl. No. 16/772,568, "Supplemental Notice of Allowability", dated May 18, 2022, 4 pages.
Australian Patent Application No. 2018253294, "First Examination Report", dated Dec. 23, 2021, 4 pages.
Australian Patent Application No. 2018291152, "Notice of Acceptance", dated Oct. 27, 2021, 3 pages.
Australian Patent Application No. 2018291152, "Third Examination Report", dated Sep. 21, 2021, 2 pages.
Australian Patent Application No. 2020202925, "Second Examination Report", dated Dec. 24, 2021, 4 pages.
Australian Patent Application No. 2020202925, "Third Examination Report", dated May 31, 2022, 5 pages.
Canadian Patent Application No. 2,924,009, "Office Action", dated Oct. 13, 2021, 2 pages.
European Patent Application No. 18784109.3, "Notice of Decision to Grant", dated Jun. 17, 2022, 2 pages.
European Patent Application No. 18822628.6, "Notice of Decision to Grant", dated Mar. 24, 2022, 2 pages.
Indian Patent Application No. 201917040928, "First Examination Report", dated Jan. 27, 2022, 8 pages.
Vielhauer, "Fundamentals in User Authentication: Techniques for Binding Identities to Information", Biometric User Authentication for it Security: From Fundamentals to Handwriting, 2006, pp. 77-115.

\* cited by examiner

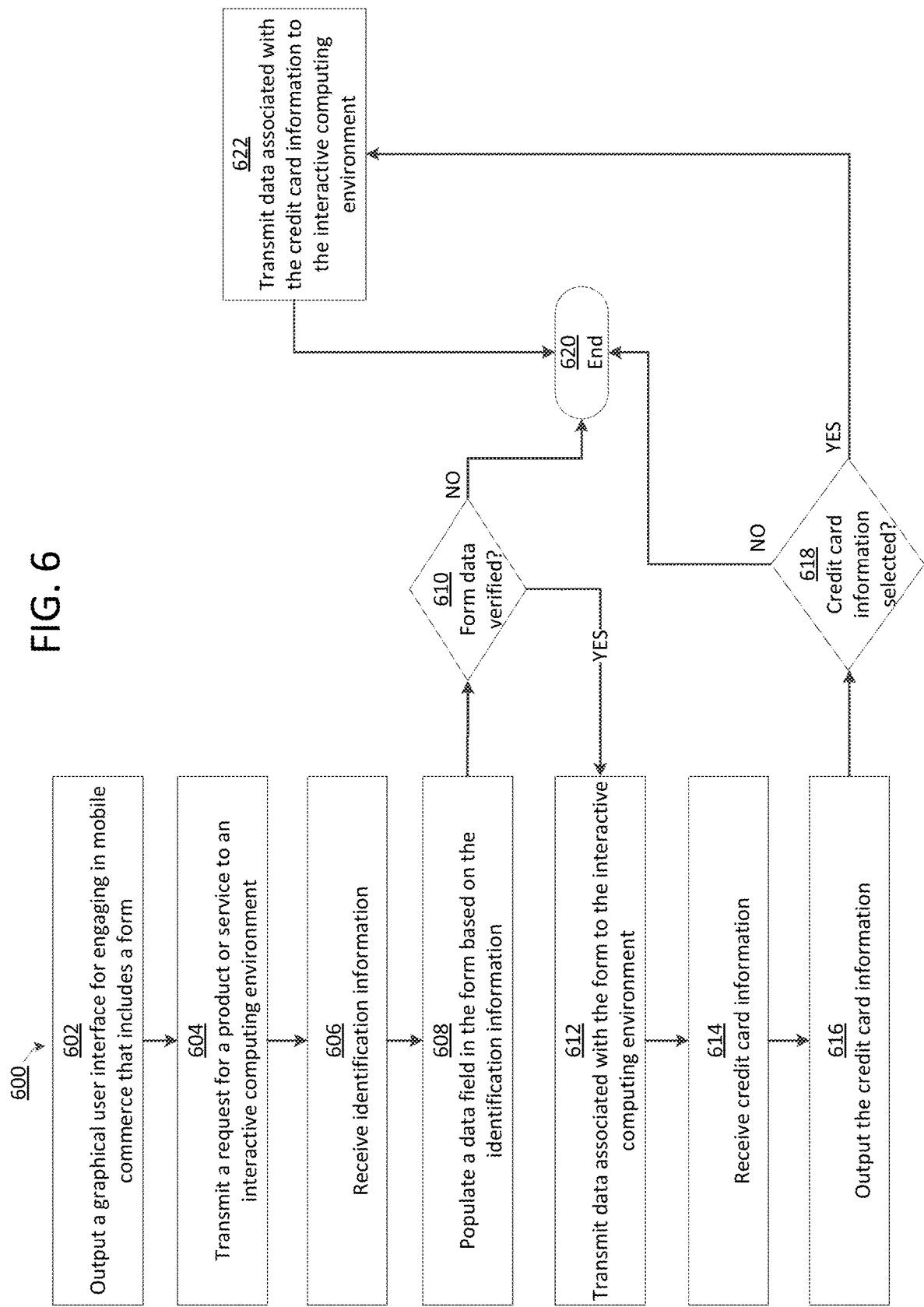

PROVIDING IDENTIFICATION INFORMATION DURING AN INTERACTION WITH AN INTERACTIVE COMPUTING ENVIRONMENT

CROSS-REFERENCE TO RELATED APPLICATIONS

This disclosure is a continuation-in-part of U.S. application Ser. No. 16/146,256 filed on Sep. 28, 2018, which is a divisional of U.S. application Ser. No. 14/512,493 filed Oct. 13, 2014, which claims priority to U.S. Provisional Application Ser. No. 61/890,419 filed Oct. 14, 2013 and titled "Mobile Commerce Application," the contents of all of which are hereby incorporated by reference.

TECHNICAL FIELD

This disclosure relates generally to computer hardware (including mobile computing devices) and methods implemented on such computer hardware, and more particularly to controlling access to functions within an interactive computing environment accessible via a mobile application.

BACKGROUND

Interactive computing environments, such as web-based applications or other online software platforms, allow users to perform various computer-implemented functions through graphical interfaces. A given interactive environment can allow a user device to access different graphical interfaces providing different types of functionality, such as searching databases for different content items, selecting the content items by storing them in a temporary memory location, and causing a server to perform one or more operations based on a selected combination of content items.

SUMMARY

Aspects and examples disclosed herein involve an identification-and-authorization system that performs third-party authorization support for online transactions (e.g., via a mobile website or other mobile application) between host server systems and mobile devices that access interactive computing environments provided by the host server systems. In one example, one or more processing devices, such as (but not limited to) one or more servers of an identification-and-authorization system, receive a data network identifier or other identifier from a computing device (e.g., a smart phone or other mobile communication device) that executes a client application, such as a dedicated application or a web-based application used for accessing an interactive computing environment of a host system. The data network identifier or other identifier can be associated with the computing device that is using one or more function of the interactive computing environment to conduct a transaction with the client application. The identification-and-authorization system can also use the data network identifier or other identifier to obtain a credential associated with the computing device. The identification-and-authorization system can also retrieve certain data elements, such as identification information, from one or more data sources with data that is indexed using, or is otherwise associated with, the credential. The identification information can be used for authorizing one or more of the online functions involved in completing the transaction that is being conducted by the computing device.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings, wherein:

FIG. 6 is a flow chart illustrating an example of a process for using the client system of FIG. 1 to facilitate electronic transactions via an interactive computing environment according to some aspects of the present disclosure.

DETAILED DESCRIPTION

Figure 1:
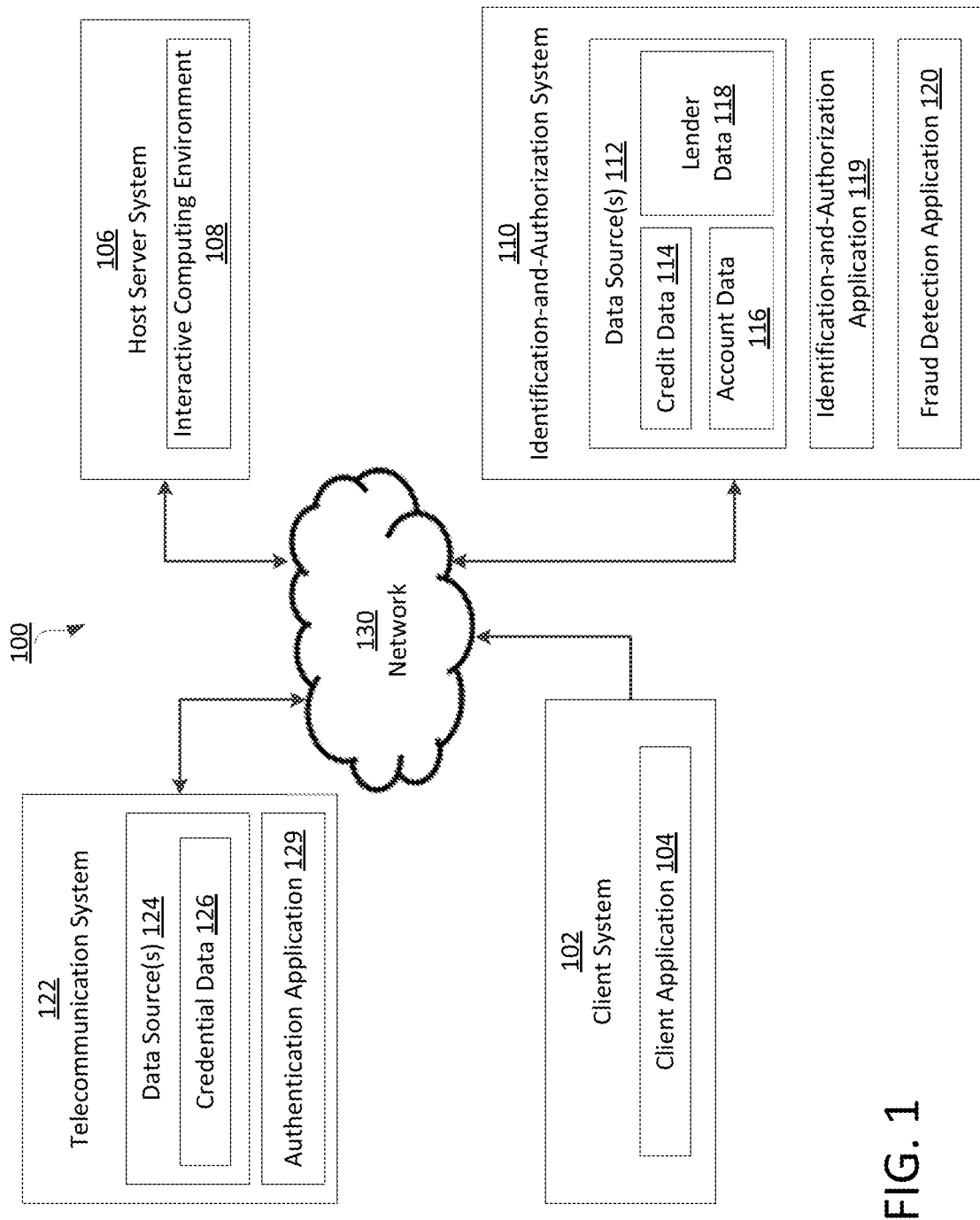
FIG. 1 is a block diagram illustrating an example of a system for facilitating online transactions between host server systems and mobile devices that access interactive computing environments provided by the host server systems according to some aspects of the present disclosure.

As described herein, certain embodiments provide improvements to interactive computing environments by solving data-security problems that are specific to online platforms hosted by a server system and accessed by mobile devices. For example, a host server may restrict access to a function for advancing an online transaction or other operation within an interactive computing environment. To obtain access to this function, a mobile device must often submit one or more authentication elements to the host server. In existing systems, one or more authentication elements must be stored on the mobile device, which may lack security features for preventing unauthorized access to the authentication elements. Additionally or alternatively, existing techniques may involve the mobile device transmitting an entire authentication element to the host server. If the mobile device transmits the credential without appropriate wireless security, such as a public wireless network, the authentication element could be intercepted by a third-party device and used by the third-party device to gain illicit or unauthorized access to the function within the interactive computing environment. Additionally or alternatively, existing techniques may involve entering the authentication element into the mobile device via an input device, such as a keyboard or microphone, which renders the authentication element susceptible to entry errors resulting from a small size of the mobile device keyboard, undetected theft via keystroke logging software or nearby microphones. Thus, wireless communications involving the Internet or other data network can reduce the security or reliability of authentication elements used to access features of an interactive computing environment.

One or more of these issues that arise with respect to online interactive computing environment can be addressed by aspects and examples disclosed herein. For instance, an identification-and-authorization system may perform third-party authorization support for online transactions (e.g., via a mobile website or other mobile application) between host server systems and mobile devices that access interactive computing environments provided by the host server systems. In one example, one or more processing devices, such as (but not limited to) one or more servers of an identification-and-authorization system, receive a data network identifier or other identifier from a computing device (e.g., a smart phone or other mobile communication device) that executes a client application, such as a dedicated application or a web-based application used for accessing an interactive computing environment of a host system. The data network identifier or other identifier can be associated with a mobile device that is using one or more functions of the interactive computing environment to conduct a transaction with the client application. The identification-and-authorization system can also use the data network identifier or other identifier to obtain a credential associated with the mobile device. The identification-and-authorization system can also retrieve certain data elements, such as identification information, from one or more data sources with data that is indexed using, or is otherwise associated with, the credential. The identification information can be used for authorizing one or more of the online functions involved in completing the transaction that is being conducted by the mobile device.

Some examples of these aspects can overcome one or more of the issues identified above by allowing a mobile device to use an authentication element within an interactive computing environment without the element having to be entered at, stored within, or transmitted by the mobile computing device. In one example, a secure identification-and-authorization system, rather than a potentially insecure mobile device, can provide a set of authentication elements to a provider system via system-to-system communications. Enhanced security provided by these system-to-system communications can reduce or eliminate the risk of third-party devices intercepting an authentication element from an insecure wireless transmission by a mobile device. In another example, an identification-and-authorization system or a provider server system can auto-populate an interface from the interactive computing environment with information, such as an authentication element. This auto-population can reduce the need for a user to manually enter one or more authentication elements into the mobile device, which can likewise reduce opportunities for theft of the authentication element via keyboard-logging software or other technologies used to clandestinely steal sensitive information. In another example, using the provider system to present the set of authentication elements via an interface can allow the provider system to limit the amount of time that the authentication elements are present on the mobile device, thereby reducing the exposure of the authentication element via the mobile device. For instance, the provider system can cause a client application on the mobile device to delete the authentication elements from any memory of the mobile device after an authentication element has been used to access a particular function within the interactive computing environment.

In accordance with some aspects, the identification-and-authorization system can provide a communication point-of-interface between various independent provider server systems and independent telecommunication providers. For example, the identification-and-authorization system, which may be used by a provider server system, can service requests from different provider server systems for authentication elements or other identification information required for accessing various functions within interactive computing environments. The identification-and-authorization system can service these requests using data network identifiers. The data network identifiers can identify mobile devices (e.g., a smart phone, tablet, e-reader, or laptop computer) involved in online transactions with interactive computing environments. Non-limiting examples of a data network identifier include an internet protocol ("IP") address assigned to a mobile computing device, a telephone number of a smart phone, etc. In some aspects, a mobile device may identify a user of the mobile via biometrics, data entry, or any other suitable process for identifying a user of a mobile device. The interactive computing environments, which are provided by provider server systems, can be accessed via online services of the provider server systems using a web browser, a dedicated mobile application, or other client applications executed on a mobile device.

In some aspects, using the identification-and-authorization system as an interface between the provider server system and a telecommunication provider facilitates third-party authorization support in real time (e.g., between commencement and completion of an online transaction). For example, during a given transaction, the identification-and-authorization system can transmit a request to a telecommunication provider to provide a credential, such as an account credential, that is associated with a user of the mobile device. The identification-and-authorization system can receive, from the telecommunication provider, a response identifying the credential. The identification-and-authorization system can use the credential to retrieve authentication elements or other identification data associated with the user.

In some aspects, the identification-and-authorization system can use the data network identifier to obtain a credential associated with the mobile device. For example, the identification-and-authorization system can transmit the data network identifier to a telecommunication system. The telecommunication system can receive the data network identifier and determine a credential associated with the data network identifier. A non-limiting example of such an associated credential is a legal name of an individual that is associated with an IP address or other data network identifier. The telecommunication system can transmit the credential to the identification-and-authorization system via a suitable data network. The identification-and-authorization system can receive the credential via the data network.

In some aspects, the identification-and-authorization system can retrieve identification information from a data source that is associated with the credential. The identification-and-authorization system can transmit the identification information, via a suitable data network, to one or more computing devices that use the identification information to grant access to one or more functions of an interactive computing environment required for completing a transaction.

As used herein, the term "identification information" can refer to any information that can be used to uniquely identify an individual or other entity. In some aspects, identification information can include information that can be used on its own to identify an individual or entity. Non-limiting examples of such identification information include one or more of a legal name, a company name, a social security number, a credit card number, a date of birth, an e-mail address, etc. In other aspects, identification information can include information that can be used in combination with other information to identify an individual or entity. Non-limiting examples of such identification information include a street address or other geographical location.

As used herein, the term "data network identifier" can refer to any information that can be used to uniquely identify a computing device (e.g., a mobile device) on a data network. In some aspects, a data network identifier can include information that can be used on its own to identify a computing device (e.g., an IP address). In other aspects, a data network identifier can include information that can be used in combination with other information to identify a computing device.

As used herein, the term "credential" can refer to any information that can be used to uniquely identify a data source including identification information of an individual or other entity. In some aspects, a credential can include information that can be used on its own to identify a data source that includes identification information of an individual or entity. Non-limiting examples of such a credential include one or more of an account number, a legal name, an address, a social security number, a credit card number, etc.

In some aspects, the identification-and-authorization system can identify and authenticate a client based on the client's mobile device. For example, the identification-and-authorization system can transmit a data network identifier associated with the client's mobile device to a telecommunication system or provider. The telecommunication system or provider can receive the data network identifier and determine identification information (e.g., the client's name, address, social security number, zip code, or other information) associated with the data network identifier. The telecommunication system can transmit the identification information to the identification-and-authorization system. The identification-and-authorization system can receive and use the identification information to identify or authenticate the client or the client's mobile device.

In some aspects, the identification-and-authorization system can provide the identification information to the client's mobile device. The mobile device can use the identification information to, for example, populate data fields in an electronic form used to obtain access to one or more features of an interactive computing environment. Automatically populating the electronic form fields can simplify accessing the one or more features for a client. Automatically populating the electronic form fields can simplify accessing the one or more features for a client.

Some examples of these aspects can overcome one or more of the issues identified above by allowing a mobile device to use an authentication element within an interactive computing environment without the authorization having to be entered at, stored within, or transmitted by the mobile computing device. In one example, a secure identification-and-authorization system, rather than a potentially insecure mobile device, can provide a set of authentication elements to a host server via system-to-system communications. Enhanced security provided by these system-to-system communications can reduce or eliminate the risk of third-party devices intercepting an authentication element from an insecure wireless transmission by a mobile device. In another example, a host server system can auto-populate an interface from the interactive computing environment with the set of authentication elements. This auto-population can reduce the need for a user to manually enter one or more authentication element into the mobile device, which can likewise reduce opportunities for theft of the authentication element via keyboard-logging software or other technologies used to clandestinely steal sensitive information. In another example, using the host server to present masked or otherwise transformed versions of authentication elements via an interface can obviate the need to store the authentication elements on the mobile device for any length of time. In this manner, security of the authentication elements and the interactive computing environment is maintained even if the interactive computing environment is accessed by an insecure mobile device, via insecure network communications, or both. The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a block diagram illustrating an example of a system for facilitating online transactions between host server systems and mobile devices that access interactive computing environments provided by the host server systems. In this example, an identification-and-authorization system 110 can include one or more server devices. The one or more server devices can include or can otherwise access one or more non-transitory computer-readable media. One or more of the data sources 112, the identification-and-authorization application 119, and the fraud detection application 120 can be stored on the non-transitory computer-readable media. The identification-and-authorization system 110 can also include one or more processing devices that are capable of executing one or more of the identification-and-authorization application 119 and the fraud detection application 120 to perform operations described herein. Examples of hardware and software components included within the identification-and-authorization system 110 are further described with respect to FIG. 2.

The data sources 112 can be stored in, for example, a database or other suitable data source. The data sources 112 can include, for example, secure and credentialed databases or other data structures managed by or otherwise accessible by the identification-and-authorization application 119. The data sources 112 can include internal databases or other data sources that are stored at or otherwise accessible to the identification-and-authorization system 110.

FIG. 1 depicts the data sources 112 as being stored at the identification-and-authorization system 110 for illustrative purposes only. Other implementations are possible. For example, the data sources 112 can also include external databases that are accessible to the identification-and-authorization system 110 via one or more suitable data networks. In some aspects, the data sources 112 can be data storage devices controlled by the owner or operator of the identification-and-authorization system 110. In other aspects, the internal or external databases can be controlled by an entity other than the owner of the identification-and-authorization system 110.

In some aspects, the data sources 112 can include credit data 114. Credit data 114 can include data associated with a client's credit file. For example, credit data 114 can include one or more of a client's name, address, social security number, credit score, one or more credit card numbers, etc. The data sources 112 can also include account data 116. Account data 116 can include data associated with a client's credit account. For example, account data 116 can include a client's name, address, an account number, authentication information (e.g., a personal identification number, a password, etc.), a username, etc. The data sources 112 can further include lender data 118. Lender data 118 can include data associated with lenders of credit or money, or other financial product or service providers. For example, lender data 118 can include data associated with a bank, trust, credit union, insurance company, brokerage firm, etc. The data sources 112 can also include any other relevant data, such as income and employment data, asset data, education data, etc. In some aspects, data from multiple data sources 112 can be linked to or otherwise associated with a given client using a referential keying system. The data sources 112 can be updated periodically or continuously.

A credit file can include a historical report associated with the credit of an individual or entity. In some aspects, a credit file can be prepared or provided by a credit bureau. In some aspects, a credit file can include one or more of identification information, a credit card account, a loan, a bankruptcy, a late payment, an inquiry, a credit score, a credit card number, etc. In some aspects, a credit file can include additional data from data sources other than credit reporting data to augment the credit reporting data. Non-limiting examples of such additional data includes information obtained from utility providers, information obtained from wireless service providers, information obtained from credit card issuers, real estate data, etc.

The identification-and-authorization application 119 can execute one or more processes for providing third-party authentication or authorization support that facilitates transactions within an interactive computing environment. The identification-and-authorization application 119 can include executable instructions stored in one or more non-transitory computer-readable media. In some aspects, the identification-and-authorization application 119 can include one or more modules, such as a web server module, a web services module, or an enterprise services module, which individually or in combination facilitate these electronic transactions. For example, a web server module can be executed by a suitable processing device to provide one or more web pages or other interfaces to a client system 102, host server system 106, or telecommunication system 122. The web pages or other interfaces can include content provided by the web services module. The web services module can generate this content by executing one or more algorithms using information retrieved from one or more of the data sources 112. The enterprise services module can be executed to retrieve the information from one or more of the data sources 112.

The fraud detection application 120 can execute one or more processes for detecting a fraudulent transaction. The fraud detection application 120 can include executable instructions stored in one or more non-transitory computer-readable media. In some aspects, the fraud detection application 120 can be executed by a suitable processing device to compare credit data 114 or account data 116 with data provided by one or more of the client system 102, the host server system 106, and the telecommunication system 122. The fraud detection application 120 can use the results of the comparison to detect data inaccuracies or questionable transaction behavior that may signify fraud. The fraud detection application 120 can provide the host server system 106 with a warning if fraud is detected.

The identification-and-authorization system 110 can electronically communicate with one or more client systems 102, host server systems 106, and telecommunication systems 122 via one or more data networks 130. The communications over these data networks 130 can be performed using any communication protocol or group of communication protocols suitable for establishing one or more secure communication links.

In some aspects, the identification-and-authorization system 110 can implement one or more procedures to secure communications between the identification-and-authorization system 110 and a client system 102, host server system 106, or a telecommunication system 122. Non-limiting examples of features provided to protect data and transmissions between the identification-and-authorization system 110 and the client system 102, host server system 106, or the telecommunication system 122 include secure web pages, encryption, firewall protection, network behavior analysis, intrusion detection, etc. In some aspects, transmissions with client systems 102, host server systems 106, or telecommunication systems 122 can be encrypted using public key cryptography algorithms using a minimum key size of 128 bits. In additional or alternative aspects, website pages can be delivered through HTTPS or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

The identification-and-authorization system 110 can communicate with one or more client systems 102, host server systems 106, and telecommunication systems 122 by applying authentication and authorization rules. The authentication and authorization rules can be used to authenticate and authorize the client system 102, host server system 106, or telecommunication system 122 to receive information from the identification-and-authorization system 110. The identification-and-authorization system 110 can communicate with the client system 102, host server system 106, or the telecommunication system 122 through a data network 130 or other information exchange.

The client system 102 can include any computing device or other communication device operated by a client (e.g., a consumer, a buyer, or other end user). The client system 102 can include one or more client applications 104. The one or more client applications 104 can include executable instructions stored in one or more non-transitory computer-readable media. The client system 102 can also include one or more processing devices that are capable of executing the client application 104 to perform operations described herein. In an example, the client application 104 can be a commerce application that provides an interface (e.g., a web browser or a mobile application) through which a client can engage in mobile commerce by accessing an interactive computing environment used by a provider of products or services. A client or other entity accessing the client system 102 can use the client application 104 to engage in a transaction with a provider (e.g., a provider accessible via a mobile application or web-based application accessible via mobile device, a provider accessible via an online system such as a website, etc.).

A host server system 106 can include one or more server devices. The one or more server devices can include or can otherwise access one or more non-transitory computer-readable media. The host server system 106 can also execute an interactive computing environment 108. The interactive computing environment 108 can include executable instructions stored in one or more non-transitory computer-readable media. The host server system 106 can further include one or more processing devices that can execute instructions configuring the interactive computing environment 108 to perform, in real time during an online transaction between a mobile device 102 and the host server system 106, operations described herein. In some aspects, the executable instructions for the interactive computing environment 108 can include instructions that provide one or more graphical interfaces. The graphical interfaces are used by a mobile device 102 to access various functions of the interactive computing environment 108. For instance, the interactive computing environment 108 may transmit data to and receive data from the client application 104 to shift between different states of interactive computing environment 108, where the different states allow one or more electronics transactions between the mobile device 102 and the host server system 106 to be performed.

In some aspects, the interactive computing environment 108 can provide an interface (e.g., a website, web server, or other server) to engage in mobile commerce with a client. In one example, a host server system 106 can be operated by a seller, lender, or other provider of products or services. The interactive computing environment 108 can be used to support a commerce application. The interactive computing environment 108 may transmit data to and receive data from the client application 104 to enable a transaction.

A telecommunication system 122 can include any computing device or group of computing devices operated by a telecommunications or wireless network provider. The telecommunication system 122 can include one or more server devices. The one or more server devices can include or can otherwise access one or more non-transitory computer-readable media. An authentication application 129 or one or more data sources 124 can be stored in one or more non-transitory computer-readable media. The data sources 124 can have any of the structures or configurations described with respect to the data sources 112 of the identification-and-authorization system 110. The telecommunication system 122 can also include one or more processing devices that are capable of executing the authentication application 129 to perform operations described herein. In some aspects, the authentication application 129 can provide an interface through which the identification-and-authorization system 110 can acquire credential data 126 from the telecommunication system 122. Credential data 126 can include data associated with a telecommunications account (e.g., a client's telecommunications account). For example, credential data 126 can include a legal name, a social security number, a credit card number, an account number, an address, a mobile phone number, a mobile account number, a proxy to a mobile account number, etc.

In some aspects, the identification-and-authorization system 110 can use data in addition to or instead of data provided by the telecommunication system 122. For example, an identifier of a user of a mobile device can be obtained using biometrics, scanning an identity card, or any other process that a computing device can use to identify a user. Identifier of the user can be provided to the identification-and-authorization system 110.

In a simplified example, an identification-and-authorization system 110 is or includes a mobile commerce facilitation system executing a facilitation application. The facilitation application is used to simplify mobile interactions (e.g., interactions performed via a mobile website or other mobile application) between providers of products or services and clients that consume or otherwise use the products or services. Mobile computing devices, such as (but not limited to) smart phones, are often associated with an individual (e.g., an owner of the smart phone). In some aspects, using the facilitation application to simplify mobile interactions can allow for an identifier of a mobile device to be used as a proxy for the identity of a user of the mobile device.

Figure 2:
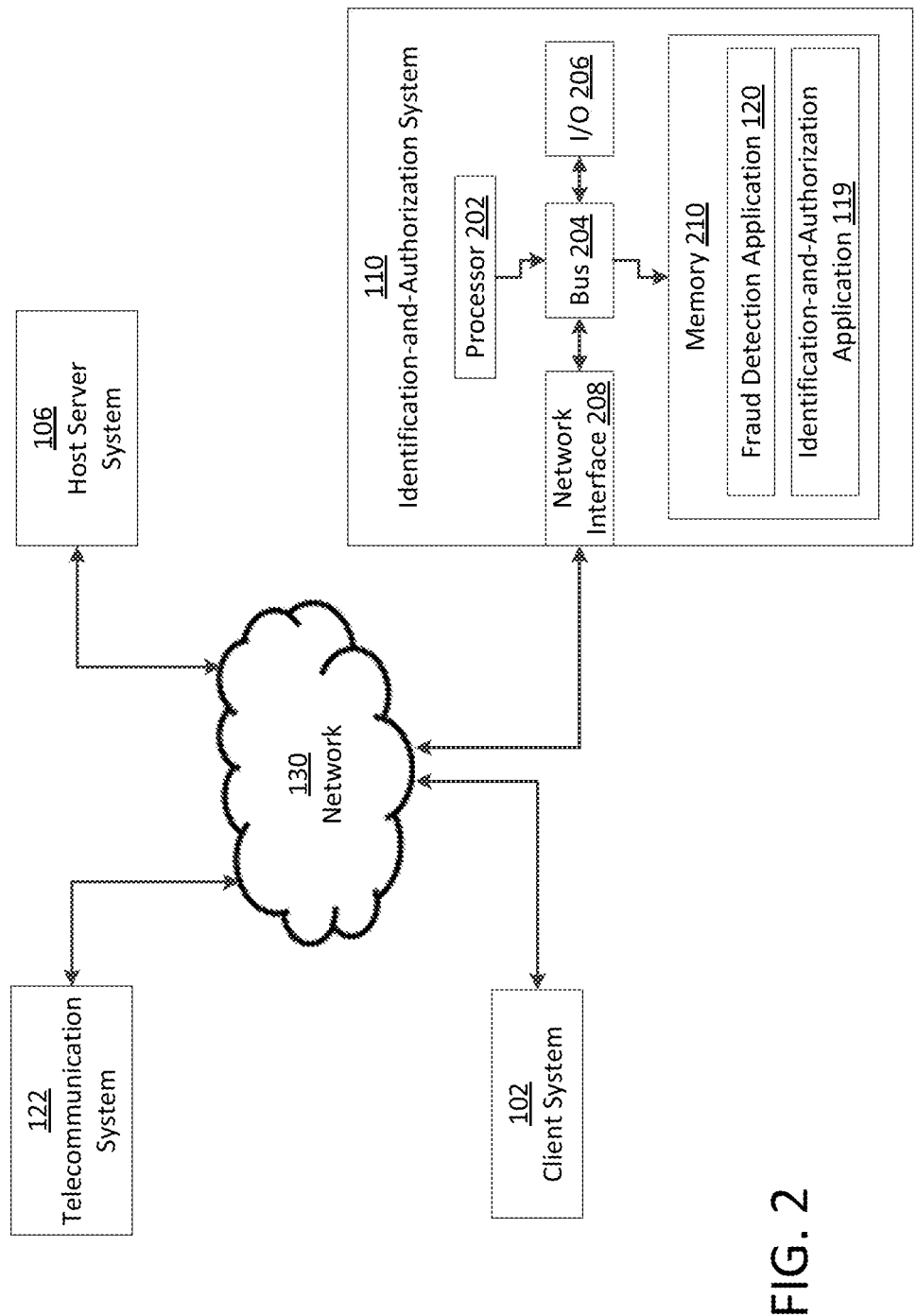
FIG. 2 is a block diagram depicting an example of an identification-and-authorization system depicted in FIG. 1 according to some aspects of the present disclosure.

FIG. 2 is a block diagram depicting an example of an identification-and-authorization system 110 depicted in FIG. 1 according to some aspects of the present disclosure. FIG. 2 depicts the identification-and-authorization system 110 as one device for illustrative purposes only. Other implementations are possible. For example, any suitable computing system or group of computing systems can be used to implement the identification-and-authorization system 110.

The identification-and-authorization system 110 can include a processor 202 that is communicatively coupled to a memory 210. The processor 202 can execute computer-executable program instructions and/or access information stored in the memory 210. The processor 202 can include any of a number of processing devices, including one. The processor 202 can include or may be communicatively coupled with a computer-readable medium such as a memory 210 that stores instructions. The processor 202 can execute the instructions stored in the memory 210 and thereby perform one or more operations described herein. Non-limiting examples of the processor 202 include a microprocessor, an application-specific integrated circuit ("ASIC"), a state machine, or any other suitable processing device or group of processing devices.

The memory 210 can include any suitable computer-readable medium. The computer-readable medium can include any electronic, optical, magnetic, or other storage device capable of providing a processor 202 with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a processor 202 can read instructions. The instructions may include processor-specific instructions generated by a compiler and/or an interpreter from code written in any suitable computer-programming language, including, for example, C, C++, C#, Visual Basic, Java, Python, Perl, JavaScript, and Action Script.

The identification-and-authorization system 110 may also include a number of external or internal devices such as input or output devices (not shown). For example, the identification-and-authorization system 110 is shown with an input/output ("I/O") interface 206 that can receive input from input devices or provide output to output devices. A bus 204 can also be included in the identification-and-authorization system 110. The bus 204 can communicatively couple one or more components of the identification-and-authorization system 110.

The identification-and-authorization system 110 can execute program code for the identification-and-authorization application 119. The program code for the identification-and-authorization application 119 can reside on any suitable computer-readable medium and may be executed on any suitable processing device. The program code for the identification-and-authorization application 119 can reside in the memory 210 of the identification-and-authorization system 110. The identification-and-authorization application 119 stored in the memory 210 can configure the processor 202 to perform the operations described herein.

The identification-and-authorization system 110 can also include at least one network interface 208. The network interface 208 can include any device or group of devices suitable for establishing a wired or wireless data connection to one or more data networks 130. Non-limiting examples of the network interface 208 include an Ethernet network adapter, a modem, and/or the like. The network interface 208 can transmit signals that are modulated with or otherwise include data generated by one or more of the identification-and-authorization application 119, the fraud detection application 120, or other applications executed by the processor 202. The network interface 208 can receive signals that are modulated with or otherwise include data that can be used by one or more of the identification-and-authorization application 119, the fraud detection application 120, or other applications executed by the processor 202.

Figure 3:
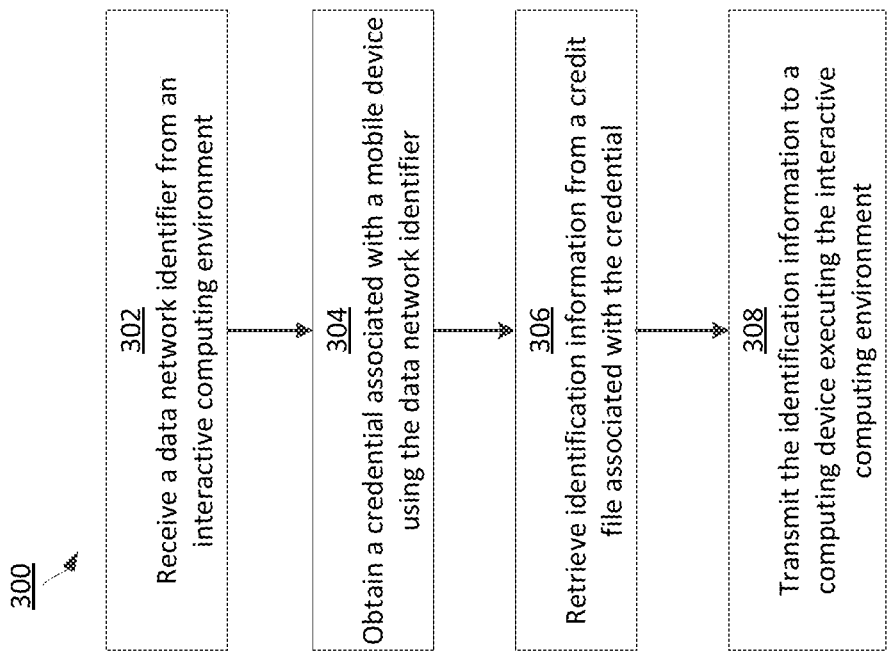
FIG. 3 is a flow chart illustrating an example of a process for using the identification-and-authorization system of FIGS. 1 and 2 to simplify or otherwise facilitate transactions within interactive computing environments according to some aspects of the present disclosure.

FIG. 3 is a flow chart illustrating an example of a process 300 for using the identification-and-authorization system 110 to simplify or otherwise facilitate electronic transactions in interactive computing environments according to some aspects of the present disclosure. For illustrative purposes, the process 300 is described with reference to implementations described above with respect to FIGS. 1-2. Other implementations, however, are possible. In some aspects, the steps in FIG. 3 may be implemented in program code that is executed by a group of processors or a single processor such as, for example, the processor 202 of FIG. 2. In some aspects of the present disclosure, one or more steps shown in FIG. 3 may be omitted or performed in a different order. Similarly, additional steps not shown in FIG. 3 may be performed.

The process 300 involves the processor 202 receiving a data network identifier or other identifier from an interactive computing environment 108, as depicted at block 302. The data network identifier can be associated with a mobile device conducting a transaction with the interactive computing environment 108. The processor 202 can execute the identification-and-authorization application 119 and thereby perform one or more operations for receiving a data network identifier from an interactive computing environment 108. For example, the identification-and-authorization application 119 can open a server port or transmit a query to the host server system 106 executing the interactive computing environment 108. The host server system 106 can responsively transmit a data network identifier to the identification-and-authorization system 110 via data network 130. In some aspects, the host server system 106 can "push" (i.e., transmit data without specifically receiving a request for the data) the data network identifier to the identification-and-authorization system 110.

The process 300 also involves the processor 202 obtaining a credential associated with a mobile device using the data network identifier, as depicted at block 304. The processor 202 can execute the identification-and-authorization application 119 and thereby perform one or more operations for obtaining a credential associated with the mobile device using the data network identifier. For example, the identification-and-authorization application 119 can configure the network interface 208 to transmit data associated with the data network identifier to a telecommunication system 122. The identification-and-authorization application 119 can establish and transmit the data to the telecommunication system 122 over a secure data connection. The telecommunication system 122 can receive the data network identifier and determine an associated credential from one or more data sources 124. For instance, the telecommunication system 122 can receive a data network identifier including an IP address and determine an associated credential including a social security number. The telecommunication system 122 can transmit the credential to the identification-and-authorization system 110. The telecommunication system 122 can also transmit other information to the identification-and-authorization system 110. The other information can include an account status (active, suspended, blacklisted, etc.), a mobile phone number, Subscriber Identity Module ("SIM") card information, etc. The identification-and-authorization system 110 can receive the credential and other information. The identification-and-authorization system 110 can store the credential and other information in memory 210.

The process 300 also involves the processor 202 retrieving identification information from a credit file associated with the credential, as depicted at block 306. The identification information can be usable for completing the transaction. The processor 202 can execute the identification-and-authorization application 119 and thereby perform one or more operations for retrieving identification information from a credit file associated with the credential. For example, the identification-and-authorization application 119 can compare the credential received from the telecommunication system 122 with the data stored in one or more data sources 112 (e.g., credit data 114) to determine an associated credit file that includes a corresponding credential. The identification-and-authorization application 119 can retrieve identification information from the credit file.

The process 300 also involves the processor 202 transmitting the identification information to a computing device executing the interactive computing environment 108, as depicted in block 308. The processor 202 can execute the identification-and-authorization application 119 and thereby perform one or more operations for transmitting the identification information to a computing device executing the interactive computing environment 108. For example, the identification-and-authorization application 119 can configure the network interface 208 to transmit a suitable electronic communication (e.g., an Extensive Markup Language ("XML") document, a web page, an e-mail, etc.) to one or more host server systems 106 executing the interactive computing environment 108.

In additional or alternative aspects, the processor 202 may access stored information about one or more third party lenders. For example, a third party lender (e.g., a bank, trust, insurance agency, or provider of goods or services) may have previously transmitted one or more business rules to the identification-and-authorization system 110 that identify how the third party lender makes decisions about prospective borrowers. The identification-and-authorization system 110 can use the identification information or data retrieved from credit data 114 with the one or more business rules to determine which financial products or services may be available to the client from the third party. Financial products or services can include credit cards, loans, store cards, bank accounts, driver's license or insurance cards, etc. The identification-and-authorization system 110 can provide the information about the available financial products or services to the client via the identification-and-authorization application 119.

In some aspects, the processor 202 may access stored information about other third parties. For example, a third party provider may have previously transmitted one or more business rules to the identification-and-authorization system 110 that identify how the third party provider makes decisions about selling or manufacturing a product. The identification-and-authorization system 110 can use the identification information or data retrieved from credit data 114 with the one or more business rules to determine which products or services may be available to the client from the third party provider. The identification-and-authorization system 110 can provide the information about the available products or services to the client via the identification-and-authorization application 119.

In some aspects, the identification-and-authorization system described herein can address issues specifically arising with respect to the hardware limitations of mobile devices. In a simplified example, interactive computing environments, such as mobile applications or other interactive software platforms, can be used for buying, selling, and obtaining services or commodities via mobile devices (i.e., "mobile commerce") has become more prevalent. To engage in a mobile transaction with a merchant or other entity, a consumer may input his or her name, address, credit card information, and other information into a mobile commerce application. A mobile commerce application can be used refer to any application or groups of applications that can be used to buy, sell, provide, and/or receive products and/or services via the Internet and/or other suitable data networks. The services can be used for a whole range of mobile services (account origination, commerce, credit-decisioning, fraud detection, etc.) and in some online services as well. Non-limiting examples of a commerce application can include an application for purchasing products or services, applying for a loan, applying for a credit card, or applying for a checking account, etc.

However, small screens on mobile devices and server connectivity issues can make entering such information difficult for clients. A client can be any individual or other entity that may purchase, consume, or otherwise utilize a product or service that can be obtained from a provider. A provider can be any individual or other entity that may manufacture, sell, perform, or otherwise provide access to a product or a service. In some aspects, a provider can be an individual or entity who provides a product or service under conditions in addition to receiving payment from the client. Non-limiting examples of a provider include retailers, automobile dealers, insurers, merchants, financial institutions, etc. Clients may have to manually input required information individually into the mobile application to be able to use a function of the interactive online environment that requires that information (e.g., accessing a transaction-completion function by providing credit card information for a mobile transaction). Clients that fail to input all of the required information may be unable to use at least some of those interactive functions while engaging in mobile transactions. By contrast, one or more processes described herein with respect to FIGS. 2 and 3, as well as other examples, can provide a frictionless and intuitive client interface through which a client can engage with an interactive computing environment using a mobile application.

In some aspects, the identification-and-authorization system can further provide information to the client's mobile device about credit cards, store cards, or other credit accounts that the client has associated with his or her credit file. The client can select a desired card or other credit account for the transaction. The presentation of credit card information, store card information, or other credit account information from the client's credit file can simplify a mobile transaction for the client. For example, the client may not need to input the credit cards or store cards or to have physical access to the credit cards or store cards for a transaction.

In some aspects, the client does not have to register and store any credit cards on a provider's website or in a mobile device to have access to the credit cards for a transaction. Rather, the identification-and-authorization system can dynamically provide the client with his or her associated credit cards during each transaction, as described above. Dynamically providing the client with his or her associated credit cards during each transaction can increase data security. The client can see and choose from multiple credit cards. The client can select a credit card to use for a particular transaction. In some aspects, the credit card data or other identification information used to complete a transaction is not stored on the mobile device or on a system other than the identification-and-authorization system (e.g., a system storing the user's credit file). The identification-and-authorization system can dynamically provide the identification information for each transaction. After systems other than the identification-and-authorization system (e.g., the mobile device or a system associated with a provider of products or services) have used the identification information for the transaction, the systems other than the identification-and-authorization system can delete the identification information.

In some aspects, the identification-and-authorization system can facilitate offering a credit card, store card, or other product or service to a client after performing a pre-screen of the client (e.g., the client's credit) contemporaneously with a transaction. Doing so can facilitate the process through which a client can purchase the credit card, store card, or other product or service (e.g., financial products or services).

Figure 4:
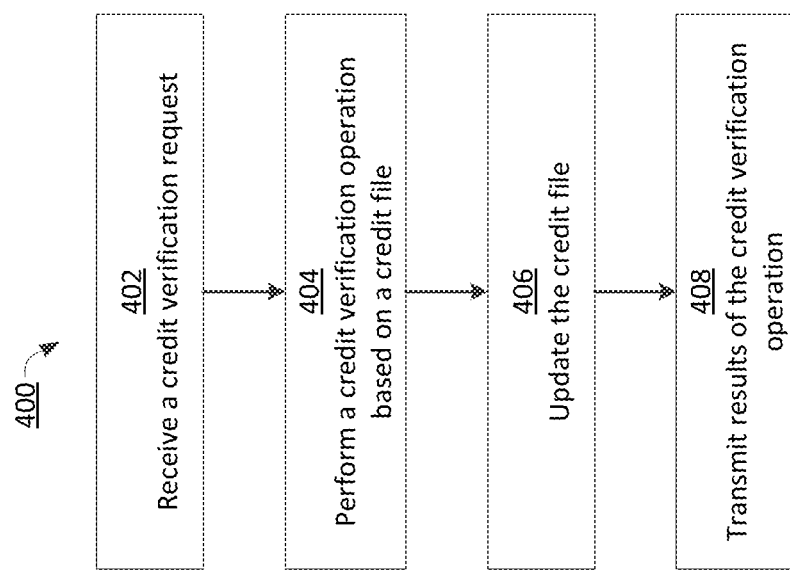
FIG. 4 is a flow chart illustrating an example of a process for using the identification-and-authorization system of FIGS. 1 and 2 to engage in a verification operation according to some aspects of the present disclosure.

FIG. 4 is a flow chart illustrating an example of a process 400 for using the identification-and-authorization system of FIG. 1 to engage in a credit application and/or verification operation according to some aspects of the present disclosure. For illustrative purposes, the process 400 is described with reference to implementations described above with respect to FIGS. 1-2. Other implementations, however, are possible. In some aspects, the steps in FIG. 4 may be implemented in program code that is executed by a group of processors or a single processor such as, for example, the processor 202 of FIG. 2. In some aspects of the present disclosure, one or more steps shown in FIG. 4 may be omitted or performed in a different order. Similarly, additional steps not shown in FIG. 4 may be performed.

The process 400 involves the processor 202 configuring the network interface 208 to receive a credit verification request, as depicted at block 402. The processor 202 can receive the credit verification request from an interactive computing environment 108. In some aspects, the credit verification request can include identification information. For example, the credit verification request can include the name or social security number of a client. The processor 202 can execute the identification-and-authorization application 119 and thereby perform one or more operations for receiving the credit verification request. For example, the identification-and-authorization application 119 can configure the network interface 208 to open a server port or transmit a query to a host server system 106 executing the interactive computing environment 108. The host server system 106 can responsively transmit the credit verification request to the identification-and-authorization system 110 via data network 130. In some aspects, the host server system 106 can "push" the credit verification request to the identification-and-authorization system 110.

In some aspects, the credit verification request can be transmitted with a data network identifier instead of or in addition to identification information. The processor 202 can interact with a telecommunication system 122 to obtain a credential associated with the data network identifier, as described in block 304 of FIG. 3. The processor 202 can identify a credit file associated with the credential, as described in block 306 of FIG. 3.

The process 400 also involves the processor 202 performing a credit application and/or verification operation based on the credit file, as depicted at block 404. The processor 202 can execute the identification-and-authorization application 119 and thereby perform one or more operations for performing the credit application and/or verification operation. For example, as described above, the identification-and-authorization system 110 can include credit data 114. The identification-and-authorization application 119 can analyze the credit data 114 to determine a credit file associated with the received identification information or credential. The identification-and-authorization application 119 can use data from the credit file to perform the credit application and/or verification operation. In some aspects, the credit application and/or verification operation can include verifying the identity of the client, verifying the relationship of the client to an account, performing fraud detection, pre-screening the client for one or more products or services, etc. An example of a credit application and/or verification operation is further described below with respect to FIG. 5.

In some aspects, the credit application and/or verification operation can include transmitting a challenge question (i.e., a security question) to the host server system 106 or the client system 102. For example, the processor 202 may transmit a challenge question to the client system 102 to confirm the identity of the client. The identification-and-authorization application 119 can receive a response from the host server system 106 or the client system 102. Based on the response, the identification-and-authorization application 119 can perform one or more functions. For example, the identification-and-authorization application 119 can configure the network interface 208 to transmit data (e.g., a warning, a validation code, a denial code, etc.) to the host server system 106 or the client system 102, continue the credit application and/or verification operation, or terminate the credit application and/or verification operation.

The process 400 also involves the processor 202 updating the credit file, as depicted at block 406. The processor 202 can update the credit file to include at least some of the identification information. The processor 202 can execute the identification-and-authorization application 119 and thereby perform one or more operations for updating the credit file. For example, the identification-and-authorization application 119 can update the credit file with one or more addresses, phone numbers, interests, credit card numbers, income levels or bands (e.g., "$50,000 to $60,000"), educational levels (e.g., "bachelor's degree), or other attributes of the client. In some aspects, the identification-and-authorization system 110 may not be authorized to update the credit file. In these cases, block 406 can be omitted.

The process 400 also involves the processor 202 transmitting the results of the credit verification operation, as depicted at block 408. The results can include a fraud detection warning, a denial code, an approval code, information about products or services (e.g., financial or other products or services) for which a client may be eligible, or other information. The processor 202 can execute the identification-and-authorization application 119 and thereby perform one or more operations for transmitting the results of the credit verification operation. For example, the identification-and-authorization application 119 can configure the network interface 208 to transmit the results of the credit verification operation to the client system 102 or the host server system 106.

In some aspects, information for the individual can be retrieved and used by a mobile commerce application to pre-fill an application for the user.

Figure 5:
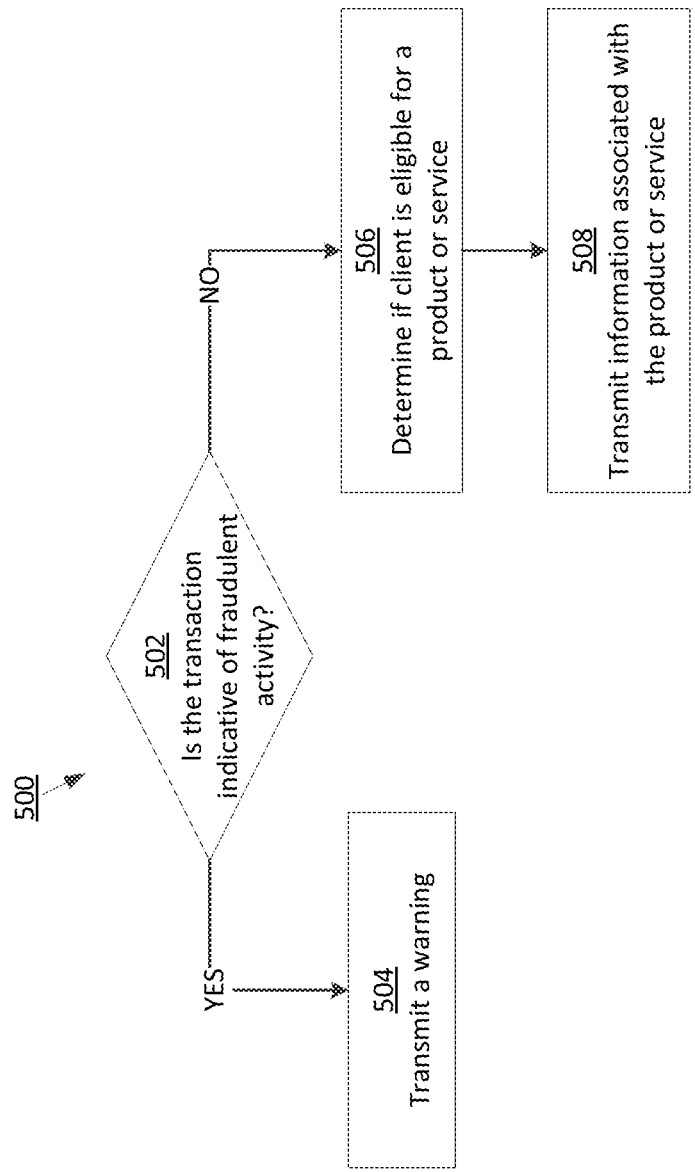
FIG. 5 is a flow chart illustrating an example of a process for performing the verification operation of FIG. 4 according to some aspects of the present disclosure.

FIG. 5 is a flow chart illustrating an example of a process 500 for performing the credit verification operation of FIG. 4 according to some aspects of the present disclosure. For illustrative purposes, the process 500 is described with reference to implementations described above with respect to FIGS. 1-2. Other implementations, however, are possible. In some aspects, the steps in FIG. 5 may be implemented in program code that is executed by a group of processors or a single processor such as, for example, the processor 202 of FIG. 2. In some aspects of the present disclosure, one or more steps shown in FIG. 5 may be omitted or performed in a different order. Similarly, additional steps not shown in FIG. 5 may be performed.

The process 500 involves the processor 202 determining whether a transaction is indicative of fraudulent activity, as depicted at block 502. The processor 202 can execute the fraud detection application 120 and thereby perform one or more operations for determining whether a transaction is indicative of fraud. For example, the fraud detection application 120 can compare credit data 114 or account data 116 with data provided by the client system 102, host server system 106, or telecommunication system 122. For instance, the fraud detection application 120 can compare credit data 114 with a legal name, a portion of (or all of) the client's social security number, or both provided by the telecommunication system 122. The fraud detection application 120 can use the results of this comparison to detect data inaccuracies or questionable transaction behavior. In some aspects, the fraud detection application 120 can execute one or more algorithms or apply a set of rules using such data to detect fraud. For example, the fraud detection application 120 can execute one or more algorithms using credit data 114 to detect the presence of fraud. The fraud detection application 120 can determine both fraudulent transaction patterns and velocity.

If the transaction is indicative of fraudulent activity, the process 500 involves the processor 202 transmitting a warning, as depicted in block 504. The processor 202 can execute the fraud detection application 120 and thereby perform one or more operations for transmitting a warning. For example, the fraud detection application 120 can generate a warning or other alert message. The fraud detection application 120 can configure the network interface 208 to transmit a signal to the host server system 106 or the client system 102 that includes the warning or other alert message. In some aspects, the host server system 106 or the client system 102 can terminate the transaction in response to receiving the warning or other alert message.

If the transaction is not indicative of fraudulent activity, the process 500 involves the processor 202 determining if a client is eligible for a product or service. The processor 202 can execute the identification-and-authorization application 119 and thereby perform one or more operations for determining if a client is eligible for a product or service. For example, the identification-and-authorization application 119 can execute an algorithm or apply a set of rules using data about the client (e.g., data associated with the client's income, address, zip code, credit, age, gender, assets, investment style, demographic, behaviors, attitudes, or spending patterns). The results can indicate if a client is eligible for a product or service (i.e., "prescreen" the client). Examples of the product or service include (but are not limited to) a credit card, store card, loan, a bank loan, an auto loan, or other product or service.

In additional or alternative aspects, the processor 202 can execute an algorithm or apply a set of rules using data about the client to determine an advertisement or other marketing tool to deliver to the client. The processor 202 can execute the identification-and-authorization application 119 and thereby perform one or more operations for determining an advertisement or other marketing tool to deliver to the client. For example, the identification-and-authorization application 119 can execute an algorithm using the client's gender, age, and spending patterns to determine an appropriate advertisement to provide to the client.

The process 500 also involves the processor 202 transmitting information associated with the product or service, as depicted at block 508. The information associated with the product or service can include a name, a uniform resource locator ("URL") or other website address, a description, a temporary credit card or store card number, a coupon or discount (e.g., a discount code or bar code), an initial or fixed credit limit, etc. The processor 202 can execute the identification-and-authorization application 119 and thereby perform one or more operations for transmitting information associated with the product or service. For example, the identification-and-authorization application 119 can configure the network interface 208 to transmit one or more signals including the information associated with the product or service to the client system 102 or the host server system 106. In some aspects, the host server system 106 can provide the information to the client with or without additional information (e.g., information about a similar product or service, a rating of the product or service, or a review of the product or service).

In additional or alternative aspects, the processor 202 can configure the network interface 208 to transmit one or more signals that include information associated with the advertisement or marketing tool. The processor 202 can execute the identification-and-authorization application 119 and thereby perform one or more operations for transmitting information associated with the advertisement or marketing tool. For example, the identification-and-authorization application 119 can generate the information associated with the advertisement or marketing tool. The identification-and-authorization application 119 can configure the network interface 208 to transmit the generated information to the client system 102 or the host server system 106. In some aspects, the host server system 106 can provide the information to the client with or without additional information (e.g., videos, links, or images).

FIG. 6 is a flow chart illustrating an example of a process 600 for using the client system 102 to facilitate electronic transactions with an interactive computing environment of a host system, according to some aspects of the present disclosure. An example of an electronic transaction in an interactive computing environment is a mobile commerce transaction. An example of a host system is a provider of products or services available via mobile commerce. For illustrative purposes, the process 600 is described with reference to implementations described above with respect to FIGS. 1-2. Other implementations, however, are possible.

In some aspects, the steps in FIG. 6 may be implemented in program code that is executed by a group of processors or a single processor. In some aspects of the present disclosure, one or more steps shown in FIG. 6 may be omitted or performed in a different order. Similarly, additional steps not shown in FIG. 6 may be performed.

The process 600 involves the client system 102 outputting a graphical user interface ("GUI") for engaging in mobile commerce, as depicted at block 602. The graphical user interface can include a form (e.g., a purchase order form). A client can interact with the GUI to engage in mobile commerce with a provider. For example, a client can select an item for purchase from the provider via the GUI. The client system 102 can detect the item selection and generate the purchase order form.

The process 600 also involves the client system 102 transmitting a request for the product or service via data network 130 to an interactive computing environment 108, as depicted at block 604. In some aspects, the client system 102 can establish and transmit the request to the host server system 106 over a secure data connection. For example, the client system 102 can configure the network interface 208 to transmit a signal including a query to the host server system 106 executing the interactive computing environment 108. The query can be transmitted from the client system 102 to the host server system 106 via an encrypted connection. The host server system 106 can receive the request for the product or service. The host server system 106 can respond to the query by transmitting identification information to the client system 102.

The process 600 also involves the client system 102 receiving the identification information, as depicted at block 606. For example, the client system 102 can configure the network interface 208 to receive identification information including a name, geographical address, zip code, e-mail address, phone number, social security number, etc. associated with the client. The client system 102 can also receive other information, such as a merchant ID number, client ID number, campaign ID number, purchase order ID number, a cart balance, a challenge question, a fraud warning or alert, etc.

The process 600 also involves the client system 102 populating one or more data fields in the form based on the identification information, as depicted at block 608. For example, the client system 102 can fill in a name field with a name. As another example, the client system 102 can fill in an address field with an address.

The process 600 also involves the client system 102 determining if the form data has been verified, as depicted at block 610. In some aspects, the client system 102 can prompt the client to verify the form data. If the client verifies the form data, the process 600 can continue to block 612. The client system 102 can receive an input via the GUI (e.g. a button in the GUI being clicked) that is indicative of the form data being verified. If the client does not verify the form data, the process 600 can terminate at block 620.

The process 600 also involves the client system 102 transmitting data associated with the form to the interactive computing environment 108, as depicted at block 612. In some aspects, the client system 102 can receive an input via the GUI that is indicative of the user submitting the form data. In response, the client system 102 can transmit data associated with the form to the interactive computing environment 108. In other aspects, the client system 102 can transmit data associated with the form to the interactive computing environment 108 without direction from the client.

In some aspects, the host server system 106 can receive the data associated with the form. The host server system 106 can responsively obtain credit card information. For example, the host server system 106 can transmit data associated with the transaction or the client system 102 to the identification-and-authorization system 110. The identification-and-authorization system 110 can determine and provide credit card information to the host server system 106. The host server system 106 can transmit the credit card information to the client system 102.

The process 600 can involve the client system 102 receiving the credit card information, as depicted at block 614. The credit card information can include one or more credit card numbers or portions of credit card numbers. The credit card information can also include an expiration date, security code, registered owner, billing address, type or brand, or other information associated with each credit card number.

The process 600 can involve the client system 102 outputting the credit card information, as depicted at block 616. The client system 102 can output, via the GUI, all or a portion of the credit card information. For example, the client system 102 can output a list of one or more available credit card numbers for the client to use in the transaction. The credit card numbers can be entirely visible or partially hidden (e.g., the first 12 digits can be hidden while the last four digits can be visible). The client system 102 can also output one or more of an expiration date, security code, registered owner, billing address, type or brand, or other information associated with each credit card number.

In some aspects, the client system 102 can rearrange the order of the credit card numbers in the list of credit card numbers from the order in which they were received. In other aspects, the client system 102 can allow the client to rearrange (e.g., via the GUI) the order of the credit card numbers. For example, the client system 102 can include a touch-screen display. The client system 102 can determine that an interaction (e.g., a tap or gesture) with the touch-screen display indicates a selection of a credit card number. The client system 102 can select a credit card number indicated by the interaction in response to the client system 102 receiving the interaction. The client system 102 can also identify that an interaction with a GUI object (e.g., an "up" arrow or a "down" arrow) is indicative of a command to change the order of credit card numbers in the list. The client system 102 can change a position of the credit card number (e.g., up or down) in the list of credit card numbers based on the interaction with the GUI object.

In some aspects, the client system 102 can receive information (e.g., from the host server system 106 or the identification-and-authorization system 110) associated with a product or service for which the client has been deemed eligible. The client system 102 can output the information, for example, via the GUI. In some aspects, the client system 102 can receive an input via the GUI indicating that the client wants to purchase the product or service. The client system 102 can transmit data associated with the choice to purchase the product or service to the host server system 106 or the identification-and-authorization system 110. In some aspects, the host server system 106 or the identification-and-authorization system 110 can receive the data associated with the choice to purchase the product or service and add the product or service to the client's order.

The process 600 can involve the client system 102 determining if credit card information has been selected, as depicted at block 618. For example, the client system 102 can determine if the client has selected a credit card number from the list of credit card numbers for use in the transaction. If the client system 102 determines that the client has not selected credit card information, the process 600 can terminate at block 620. If the client system 102 determines that the client has selected credit card information, then the process 600 can involve transmitting data associated with the credit card information to the interactive computing environment 108, as depicted at block 622. For example, the client system 102 can transmit a selected credit card number, and an associated security code, billing address, and expiration date to the interactive computing environment 108.

In some aspects, the interactive computing environment 108 can receive the credit card information and complete the transaction. For example, the interactive computing environment 108 can add the order to a fulfillment database. The interactive computing environment 108 can also generate a receipt and provide the receipt to the client (e.g., via e-mail, a webpage, or by other means).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   receiving, by a server system and via a first network connection to a host computing system, a verification request from the host computing system, wherein the verification request includes a first identification information associated with a user of a mobile device, and wherein processing the verification request utilizes a credit file of the user;
   performing, by the server system, a verification operation based on a second identification information in the credit file in response to receiving the verification request, wherein the performing comprises determining a user eligibility for a product or service with a transaction based on the second identification information in the credit file;
   updating, by the server system, the credit file with at least some of the first identification information;
   transmitting, by a server system, results of the verification operation;
   receiving, by the server system, a communication from the host computing system, wherein the communication is transmitted based on a request from a mobile device to interact with an online computing system hosted by the host computing system, wherein the request to interact is for completing the transaction conducted via the mobile device;
   obtaining, by the server system and from the communication, i) a network identifier associated with the mobile device and ii) the first identification information associated with the user of the mobile device;
   establishing, by the server system, a second network connection to a telecommunication computing system;
   providing, by the server system, the network identifier to the telecommunication computing system via the second network connection;
   obtaining, by the server system and from the telecommunication computing system using the network identifier of the mobile device, credential data that is associated with a telecommunications account and identifies the user of the mobile device;
   retrieving, by the server system using the credential data, a responsive set of identification information from a credit file of the user having second identification information associated with the user, wherein the credit file of the user is prepared by a credit bureau and comprises a historical report associated with a credit of the user;
   authenticating, by the server system and on behalf of the host computing system, the user of the mobile device by comparing the first identification information to one or more data elements obtained from the credit file;
   transmitting, from the server system to the host computing system, an electronic communication that is generated based on authenticating the user and that indicates that the mobile device is authorized to interact with the online computing system; and
   transmitting the responsive set of identification information, wherein transmitting the responsive set of identification information causes the mobile device to receive the responsive set of identification information and to populate fields of a graphical interface on the mobile device based on the responsive set of identification information.

2. The method of claim 1, wherein the network identifier comprises the first identification information.

3. The method of claim 1, wherein obtaining the credential data comprises:
   establishing a secure data connection with the telecommunication computing system;
   transmitting a request for the credential data to the telecommunication computing system, wherein the request for the credential data comprises the network identifier; and
   receiving the credential data from the telecommunication computing system.

4. The method of claim 3, further comprising:
   receiving a credit verification request from the host computing system; and
   performing, based on the credential data and the one or more data elements obtained from the credit file, a credit verification operation in response to receiving the credit verification request,
   wherein the electronic communication comprises a result of the credit verification operation.

5. The method of claim 1, wherein performing the verification operation comprises determining whether the request to interact with the online computing system is indicative of fraudulent activity.

6. The method of claim 5, further comprising:
   determining that the request to interact with the online computing system is indicative of the fraudulent activity; and
   transmitting, from the server system to the host computing system, a warning to terminate the request.

7. The method of claim 1, wherein the first identification information comprises at least one of a name of the user, a social security number associated with the user, a geographic address associated with the user, or a credit card number associated with the user.

8. The method of claim 1, wherein the first network connection is a secure data connection, and wherein the communication is provided via the secure data connection.

9. The method of claim 1, wherein transmitting results of the verification operation comprise:
   transmitting, via the first network connection and to the mobile device, information associated with the product or service.

10. The method of claim 9, wherein the product or service comprises a financial product or service from a third party lender.

11. A system comprising:
    a processing device; and
    a non-transitory computer-readable medium communicatively coupled to the processing device and storing instructions executable by the processing device, wherein the processing device is configured to execute the instructions to perform operations comprising:

receiving, by a server system and via a first network connection to a host computing system, a verification request from the host computing system, wherein the verification request includes a first identification information associated with a user of a mobile device, and wherein processing the verification request utilizes a credit file of the user;

performing, by the server system, a verification operation based on a second identification information in the credit file in response to receiving the verification request, wherein the performing comprises determining a user eligibility for a product or service with a transaction based on the second identification information in the credit file;

updating, by the server system, the credit file with at least some of the first identification information;

transmitting, by the server system, results of the verification operation;

receiving, by the server system, a communication from the host computing system, wherein the communication is transmitted based on a request from a mobile device to interact with an online computing system hosted by the host computing system, wherein the request to interact is for completing the transaction conducted via the mobile device;

obtaining, by the server system and from the communication, i) a network identifier associated with the mobile device and ii) the first identification information associated with the user of the mobile device;

establishing, by the server system, a second network connection to a telecommunication computing system;

providing, by the server system, the network identifier to the telecommunication computing system via the second network connection;

obtaining, by the server system and from the telecommunication computing system using the network identifier of the mobile device, credential data that is associated with a telecommunications account and identifies the user of the mobile device;

retrieving, by the server system using the credential data, a responsive set of identification information from a credit file of the user having second identification information associated with the user, wherein the credit file of the user is prepared by a credit bureau and comprises a historical report associated with a credit of the user;

authenticating, by the server system and on behalf of the host computing system, the user of the mobile device by comparing the first identification information to one or more data elements obtained from the credit file;

transmitting, from the server system to the host computing system, an electronic communication that is generated based on authenticating the user and that indicates that the mobile device is authorized to interact with the online computing system; and transmitting the responsive set of identification information, wherein transmitting the responsive set of identification information causes the mobile device to receive the responsive set of identification information and to populate fields of a graphical interface on the mobile device based on the responsive set of identification information.

12. The system of claim 11, wherein obtaining the credential data comprises:

establishing a secure data connection with the telecommunication computing system;

transmitting a request for the credential data to the telecommunication computing system, wherein the request for the credential data comprises the network identifier; and receiving the credential data from the telecommunication computing system.

13. The system of claim 11, wherein the operations further comprise determining whether the request to interact with the online computing system is indicative of fraudulent activity.

14. The system of claim 13, where the processing device is further configured for:

determining that the request to interact with the online computing system is indicative of the fraudulent activity; and transmitting, from the server system to the host computing system, a warning to terminate the request.

15. The system of claim 11, wherein the first identification information comprises at least one of a name of the user, a social security number associated with the user, a geographic address associated with the user, or a credit card number associated with the user.

16. The system of claim 11, wherein the first network connection is a secure data connection, and wherein the communication is provided via the secure data connection.

17. The system of claim 11, wherein transmitting results of the verification operation comprise:

transmitting, via the first network connection and to the mobile device, information associated with the product or service.

18. The system of claim 17, wherein the product or service comprises a financial product or service from a third party lender.

* * * * *